United States Patent [19]

Katz

[11] Patent Number: 4,628,003
[45] Date of Patent: Dec. 9, 1986

[54] HIGH TEMPERATURE HEAT SEAL FILM

[76] Inventor: Morton Katz, 2245 Lane Rd., Columbus, Ohio 43220

[21] Appl. No.: 713,947

[22] Filed: Mar. 20, 1985

Related U.S. Application Data

[63] Continuation of Ser. No. 439,187, Nov. 4, 1982, abandoned, which is a continuation-in-part of Ser. No. 290,870, Aug. 7, 1981, abandoned.

[51] Int. Cl.$^4$ .................. B32B 15/08; B32B 27/30
[52] U.S. Cl. ............... 428/377; 174/110 SR; 174/110 FC; 174/120 SR; 428/323; 428/334; 428/336; 428/335; 428/192; 428/447; 428/473.5; 428/476.3; 428/408; 428/392; 428/391; 428/421; 428/422
[58] Field of Search ............. 428/422, 421, 473.5, 428/447, 323, 408, 336, 335, 334, 476.3, 37, 192, 377, 392, 391; 174/110 R, 108, 110 SR, 110 FC, 120 SR

[56] References Cited

U.S. PATENT DOCUMENTS

| | | | |
|---|---|---|---|
| T884,008 | 3/1971 | Gumerman | 428/422 |
| 3,168,417 | 2/1965 | Smith | 117/213 |
| 3,278,311 | 11/1966 | Edwards | 260/37 |
| 3,352,714 | 11/1967 | Anderson | 428/422 |
| 3,361,586 | 1/1968 | Lindsey | 117/46 |
| 3,484,286 | 12/1969 | Beck | 117/235 |
| 3,577,314 | 5/1971 | Evans | 161/189 |
| 3,592,714 | 7/1971 | Katz | 428/473.5 |
| 3,616,177 | 10/1971 | Gumerman | 161/165 |
| 3,642,569 | 2/1972 | Gerow | 308/238 |
| 3,685,878 | 8/1972 | Orkin | 174/120 |
| 3,692,924 | 1/1972 | Nye | 174/120 SR |
| 3,770,556 | 11/1973 | Gerow | 428/473.5 |
| 3,791,909 | 2/1974 | McKee | 428/473.5 |
| 4,091,924 | 5/1978 | Newton | 206/389 |
| 4,137,949 | 2/1979 | Linke | 428/422 |
| 4,156,049 | 5/1979 | Hodes | 428/409 |
| 4,161,564 | 7/1979 | Legbandt | 428/381 |
| 4,198,195 | 4/1980 | Sakamaki | 418/133 |
| 4,273,829 | 6/1981 | Perreault | 428/383 |
| 4,329,399 | 5/1982 | Swerlick | 428/422 |

FOREIGN PATENT DOCUMENTS

| | | |
|---|---|---|
| 972007 | 10/1964 | United Kingdom . |
| 1126012 | 4/1967 | United Kingdom ............ 428/422 |

*Primary Examiner*—Ellis P. Robinson

[57] ABSTRACT

For use as a heat sealable, high temperature, insulative wrapping, a laminar structure of a polyimide inner layer and two fluoropolymer outer layers wherein the outer layers are pigmented for a combination of color, increased heat aged bond retention, and reduced heat seal energy requirements.

7 Claims, No Drawings

HIGH TEMPERATURE HEAT SEAL FILM

CROSS REFERENCE TO RELATED APPLICATIONS

This is a continuation of application Ser. No. 439,187, filed Nov. 4, 1982, now abandoned, which is a continuation-in-part of patent application Ser. No. 290,870, filed Aug. 7, 1981, now abandoned.

BACKGROUND OF THE INVENTION

1. Field of the Invention

The present invention relates to a laminar film material wherein a base film layer of polyimide material is covered on both major surfaces by a particular, heat sealable, fluorinated polymer material having a filler of inorganic pigment. The film material of the invention is especially useful as an insulating wire wrap material with excellent high temperature properties.

2. Description of the Prior Art

Polyimide film materials have often been used with other materials—films or coatings—to provide a laminate or composite exhibiting a combination of the properties of the component materials. Laminar films have, for example, been made having polyimide as a base layer and an unpigmented heat sealable fluorinated polymer as a coating thereon. Such laminar films have also been made having an alpha-chloromethylphenyltrialkoxy silane as an adhesive promoter between the polyimide and the fluoropolymer layers.

Laminar films have been made wherein polyimide is the base layer, each side of the polyimide is coated with a different fluoropolymer, and, as a means for identifying the fluoropolymer, in one of the fluoropolymers there is a colorant pigment material.

SUMMARY OF THE INVENTION

According to this invention, there is provided a laminar structure comprising an inner layer of a polyimide and two outer layers of a fluoropolymer wherein both of the outer layers include from 1 to 20 weight percent of a finely divided inorganic pigment material. The pigment material is substantially evenly distributed throughout the outer layer material and serves a combination of several functions. The preferred pigments are carbons.

There is also provision, in this invention, for use of a specific silane compound dispersed in the outer layer material and concentrated between the inner and outer layers of the laminar structure. The silane is alpha-chloromethylphenyltrialkoxy silane, and is present in the structure in from 0.1 to 0.3 weight percent based on total weight of the structure.

DETAILED DESCRIPTION OF THE INVENTION

The laminar structure of this invention finds special use in insulating wires or cables of electrical conductors wherein the structure is wrapped around the wire and is then heat sealed to yield a continuous coating. In such use, the polyimide inner layer provides electrical insulation with high temperature stability and the fluoropolymer outer layers provide additional electrical insulation and, more importantly, provide heat sealing adhesive. The pigmentation in both of the outer layers provides permanent coloration, increased heat seal strength after thermal aging, and a selective infrared absorber for accomplishing heat seals with reduced energy.

The polyimide of the inner layer in the laminar structure of this invention is a polypyromellitimide of bis(4-aminophenyl)ether such as described, for example, in U.S. Pat. Nos. 3,179,614 and 3,179,631. The inner layer must be thick enough to provide adequate electrical insulation properties and film strength and integrity and must be thin enough to be flexible and mold closely to articles wrapped by the structure. For most uses, the polyimide inner layer material should be about 10 to 150 microns thick.

In order to increase adhesion between the polyimide inner layer and the fluorocarbon polymer outer layers, it has been found that a small amount of a particular silane material can be added between the layers. The silane is alpha-chloromethylphenyltrialkoxy silane and is believed to contain chemical groups which are attracted to the polyimide and to the fluorocarbon polymer, thus causing an increased adherence between the layers. The silane is present in small amount as an adhesion promoter and, while it may be concentrated between the inner and outer layers of the structure, it will not be characterized as a layer itself. The silane is present at a concentration of 0.1 to 0.3 weight percent of the laminar structure and about 0.5 to 10 weight percent of the outer layers. Use of the silane as an adhesive promoter is disclosed in U.S. Pat. No. 3,642,569.

The fluoropolymer of the outer layers is preferably a copolymer of hexafluoropropylene and tetrafluoroethylene wherein there is about 5 to 50 weight percent hexafluoropropylene and 95 to 50 weight percent tetrafluoroethylene. Copolymers having different proportions may be used, but the balance of properties provided by the above ranges has been found most desirable for purposes of this invention.

The particular copolymer specified as the copolymer preferred for use in the structure of this invention has been found to provide improved results over other fluorocarbon polymer materials which are known and available. For example, it is important that both outer layers have a melting point of less than about 300° C. to avoid degradation of electrical cable components and metal wire coatings of tin, nickel, or silver during the insulation winding and and sealing processes. Relatively higher melting fluorocarbon polymers, such as homopolymers of tetrafluoroethylene are not satisfactory in the practice of this invention. Copolymers of tetrafluoroethylene with perfluoroalkylvinylether, such as perfluoropropylvinyl ether, or even with olefins, such as ethylene, are eligible for use herein, provided that the melting point of the fluoropolymer is less than about 300° C.

The fluoropolymer outer layers have, as one function, to provide heat seal adhesion for the polyimide inner layer when the structure is wrapped about a wire or cable or the like. As a heat sealing adhesive, it has been found that outer layer thicknesses of about 1 to 200 microns are most effective and thicknesses of 2 to 50 microns are preferred. Too little adhesive material causes inadequate seal bond strength and too much requires inordinately long sealing times at elevated temperatures in formation of the heat seal.

The pigment used as filler in the outer layers can be any pigment which is substantially chemically unreactive with the fluoropolymer and which exhibits temperature stability up to about 700° C. Eligible pigments are generally inorganic and include carbons, titanium dioxide, cadmium red, zinc chromate, lead chromate, and the like. Carbon black is especially preferred for infrared absorption and carbon black and titanium dioxide have been found to result in increased heat seal strength after heat aging. All of the pigments yield colored structures of increased opacity.

To serve the purpose of coloration and increased visibility, it has been found that the pigments should be used in amounts of about 0.5 to 10 weight percent based on the total weight of the laminar structure. Of course, the amount of pigment desirable for purposes of coloration varies with the kind and particle size of pigment used; but it has been generally found that at least 1 weight percent is advisable to obtain adequate color and that, while there is no actual upper limit, more than about 5 weight percent seems to provide only slight additional color intensity.

The laminar structure of this invention is particularly useful because the pigmentation provides means for heat sealing a wrapped strip of the structure using less heat than would be required using an unpigmented material. A strip of the structure of this invention can be spirally wrapped on a wire or cable such that the edges of the strip overlap and then the strip can be sealed to itself by exposure to radiant heat. On such exposure, infrared energy is preferentially absorbed by the pigment and, because the pigment is in the fluoropolymer outer layers, the temperature of those layers is increased at a faster rate than the temperature of the remainder of the laminar structure and the wrapped wire or cable, itself. The pigment in the outer layers for selectively absorbing infrared energy in the layers to be melted not only permits use of less heat to make the seal, but also permits making the heat seal without heating the wire or cable being wrapped to as high a temperature as would be expected. Thus, use of the laminar structure of this invention permits winding and sealing of wire or cable, or the like, with less risk of thermal damage to components of the article being wound.

Because infrared energy is absorbed as a function of pigment concentration, it has been found that the more pigment that is present, the more easily will the outer layers melt and form a heat seal. At least 1 weight percent of pigment should be present based on total weight of the outer layers of the structure. It has been found that pigment in concentrations of more than about 10 percent of the outer layers may reduce the strength and thermal stability of the fluoropolymer material and may even interfere with adhesion between the fluoropolymer and the polyimide. To avoid such difficulties, it is important to divide the pigment between both of the outer layers rather than locate the pigment only in one outer layer.

It has been found that there is also another important reason for having substantially the same amount of pigment in each of the two outer layers. When a strip of the structure of this invention is wrapped in spiral, overlapping manner around a wire or cable, in the overlap, the outer layer on one side of the structure is positioned against the outer layer on the other side of the structure. It is important that exposure to radiant energy to obtain a heat seal should result in melting both outer layers at about the same time and rate; and it is believed that such can be accomplished by substantially equal division of the pigment between the outer layers.

For reasons not entirely understood, the presence of pigment in the outer layers also results in increased retention of heat seal bond strengths after heat aging. Heat seals made by sealing together two of the pigmented structures of this invention in a fin-seal configuration generally exhibit a retention of more than 60 percent of the initial seal strength after heat aging the seal for 21 days at 200° C., while heat seals made using similar materials but with unpigmented outer layers generally exhibit less than 50 percent of the initial seal strength after the same heat aging. The preferred concentration of pigment in the fluoropolymer for purposes of aged seal strength retention is from about 2 to 7 weight percent, based on the fluoropolymer outer layers. It is believed that there is no actual lower limit because the presence of any amount of pigment will provide some benefit. At concentrations above about 8 weight percent based on the fluoropolymer, the retained seal strength seems to be no longer increased.

For all of the reasons set out above, it has been concluded that, to obtain the combined benefits of coloration, heat seal strength retention, and heat seal formation at reduced energy requirements, each of the outer layers of the laminar structure should include 1 to 10 percent pigment, based on the weight of the outer layers.

The particle size of the pigment does not seem to be important; any usually used form of the pigment being apparently satisfactory.

It has been found that the form of the structure of this invention is more important than the method for making it. While the examples which follow teach preparation of the structure of this invention by coating dispersions onto a test film, the structure can also be made by coextruding the inner and outer layers and by laminating separate and individual film layers together.

DESCRIPTION OF THE PREFERRED EMBODIMENTS

In the following examples, several pieces of polyimide film, 25 microns thick, were coated by several different aqueous dispersions of fluoropolymer material, pigmented to yield laminar structures of this invention, and unpigmented to yield a control structure for purposes of comparison.

The polyimide film for use as the inner layer was film sold by E. I. du Pont de Nemours and Company under the trademark designation, "Kapton" Type H.

The fluorocarbon polymer outer layers are applied to the inner layer by coating aqueous dispersions of fluorocarbon polymer on the inner layer and then drying the coating and coalescing the fluorocarbon polymer particles to yield a continuous coating. The aqueous dispersions are made as follows:

Dispersion A—This is the starting dispersion for all that follows and is a 20 weight percent dispersion of a copolymer of 7–27 weight percent hexafluoropropylene and 73–93 weight percent tetrafluoroethylene. Preparation of such a dispersion is described in U.S. Pat. Nos. 2,833,686; 2,946,763; and 3,051,683; and a 22 weight percent dispersion of that copolymer is sold by E. I. du Pont de Nemours and Company under the trademark designation "Teflon" FEP-120. Dispersion A was made by diluting the FEP-120 to a 20 weight percent concentration with distilled water.

Dispersion B—This is a dispersion of the fluorocarbon polymer with a material to aid in wetting the inner layer and provide an even coating of outer layer materials. A solution was made of 0.8 grams of a surfactant sold by B. F. Goodrich under the trademark designation "Carbopol" 934 in 27 grams of distilled water with the pH adjusted to 9 using ammonium hydroxide; and that solution was mixed with 214 grams of Dispersion A. "Carbopol" 934 is believed to be a polyvinylcarboxylic acid. Other surfactant materials with similar chemical structures and functions would also be effective for use in this invention and, in fact, use of the surfactant is not necessary to the practice of the invention. Use of a surfactant is merely helpful to promote product uniformity.

Dispersion C—This is a dispersion of the fluorocarbon polymer and surface active material of Dispersion B with a particular silane adhesion promoter. A solution was made by adding 0.04 gram of alpha-chloromethylphenyltrimethoxy silane and one drop of acetic acid to a combination of 1.78 grams water and 1.78 grams isopropyl alcohol. That solution was then mixed with the composition which results from preparing Dispersion B.

EXAMPLE 1

For this example, the outer layers contained graphite. To make a master graphite dispersion, 8.8 grams of graphite were placed, with 400 grams of Dispersion B, in a pebble mill. The graphite had an average particle size of 0.56 to 0.62 micron, and exhibited a purity of 99.6 percent. The graphite used herein was a product sold under the trademark designation "KS-2" by the Joseph Dixon Crucible Co., Jersey City, N.J., U.S.A. 07303, but equivalent graphite products are eligible. The pebble mill was rolled for 16 hours and 60 grams of the resulting master graphite dispersion was mixed with 83 grams of Dispersion B to yield a pigmented fluoropolymer coating composition.

The graphite/fluoropolymer coating composition was applied, as a 25 micron thick wet layer, to polyimide sheets using a drawdown coating bar known as a Bird applicator, sold by Bird & Sons, Walpole, Conn., U.S.A. The coated film was hung in a vertical position until dry and then the coating was coalesced in a circulating air oven at 400° C. for four minutes. Because only one side of test strips are used in heat aging tests of peel bond strength, only one side of the sheets need be coated herein for such testing. In use of the laminar structure of this invention as wire or cable wrapping, it is necessary and important that both sides of the polyimide sheet be coated to yield a structure which includes an inner layer and two outer layers.

Strips of the coated material were cut 2.5 centimeters wide and fin seals were made by placing two strips together fluoropolymer side to fluoropolymer side at 350° C. under 138 kilopascals for 20 seconds. Thermal aging of the seals was conducted in an air circulating oven at 200° C. The fin seals were peeled in a tensile tester after several different durations of thermal aging to determine peel strength values and bond retention with time of aging. Results of the tests are provided in Table I below.

EXAMPLE 2

For this example, the outer layers contained a lampblack in the same concentration as the graphite in Example 1. A master lampblack dispersion was made by pebble milling for 16 hours a mixture of 300 grams of Dispersion B with 6.6 grams of lampblack. The lampblack had an average particle size of 0.1 to 0.4 microns, and exhibited a minimum purity of 97.9 percent. The lampblack used herein was a product sold under the trade name designation "B-5" by Monsanto Industrial Chemicals Co., St. Louis, Mo., U.S.A., but equivalent lampblack products are eligible. A coating composition was made by mixing 60 grams of the resulting master lampblack dispersion with 80 grams of Dispersion B.

Sheets were coated, strips were cut, and seals were made and tested, all as described in Example 1. Results are provided in Table I.

EXAMPLE 3

In this example, the outer layers contained titanium dioxide pigment with an average particle size of about 0.2 micron and a minimum purity of about 94 percent. The titanium dioxide pigment used herein was a product sold under the trademark designation "Ti-Pure R-900" by E. I. du Pont de Nemours and Company, but equivalent titanium dioxide pigments are eligible as are other commonly used pigment compounds. A master titanium dioxide dispersion was made by pebble milling for 16 hours a mixture of 300 grams of Dispersion B, 30 grams of the titanium dioxide, and 0.045 gram of potassium tripolyphosphate as a surfactant. A coating composition was made by mixing 10 grams of the resulting master titanium dioxide dispersion with 94 grams of Dispersion B.

Sheets were coated, strips were cut, and seals were made and tested, all as described in Example 1. Results are provided in Table I.

EXAMPLE 4

For this example, the outer layers contained the same graphite in the same concentration as was disclosed in Example 1. In this Example 4, however, Dispersion C was used instead of Dispersion B both in the pebble milling step and in the diluting step after milling. Sheets were coated, strips were cut, and seals were made and tested, all as described in Example 1. Results are provided in Table I.

COMPARATIVE EXAMPLE A

In this Comparative Example, sheets were coated using Dispersion B without pigment as the coating composition, strips were cut, and seals were made and tested, all as described in Example 1. Results are provided in Table I.

COMPARATIVE EXAMPLE B

In this Comparative Example, sheets were coated using Dispersion C without pigment as the coating composition, strips were cut, and seals were made and tested, all as described in Example 1. Results are provided in Table I.

TABLE I

| Example No. | Pigment (wt % FEP solids) | Peel Values (g/cm) Days | | | | Bond Retention after 21 days (% of initial) |
|---|---|---|---|---|---|---|
| | | 0 | 3 | 12 | 21 | |
| 1 | Graphite (4.6) | 394 | 327 | 287 | 228 | 58 |
| 2 | Lampblack (4.6) | 338 | 248 | 220 | 224 | 66 |
| 3 | TiO$_2$ (4.4) | 386 | 366 | 272 | 252 | 65 |
| 4 | *Graphite (4.6) | 315 | 276 | 342 | 275 | 87 |
| A | None | 378 | 311 | 189 | 157 | 42 |
| B | *None | 441 | 476 | 402 | 283 | 64 |

*includes 1.0 wt. percent alpha-chloromethylphenyltrimethoxy silane as adhesive promoter Comparing Examples 1, 2 and 3 with Comparative Example A, it is clear that peel values remain substantially higher after heat aging when pigments are used in the fluoropolymer layers than when the fluoropolymer is used without pigment. Comparing Example 4 with Comparative Example B, it is seen that, even when the silane adhesion promoter is used, the fin seals of pigmented fluoropolymer outer layers retain a greater percentage of initial strength than the fin seals of unpigmented fluoropolymer outer layers.

EXAMPLE 5

In this example, coating compositions were made and coated using the same procedures and materials as were used in Example 1 with the exceptions noted below. The resulting laminar structures were aged and tested as described in Example 1 and results of the tests are provided in Table II along with test results of an unpigmented control. In all portions of this Example 5, the pigment was graphite and the fluoropolymer was a copolymer of about 7–27 weight percent hexafluoropropylene and about 73–93 weight percent tetrafluoroethylene sold in the form of a 22 weight percent aqueous dispersion by E. I. du Pont de Nemours and Company under the trademark designation "Teflon" FEP TE-9519.

EXAMPLE 5(a)

This example utilized graphite having an average particle size of 1 to 4 microns in an aqueous dispersion with a solids content of 22 weight percent. This graphite was sold by Grafo Colloids Corp., Sharon, Pa., U.S.A., under the trademark designation "Grafo 1224".

EXAMPLE 5(b)

This example utilized graphite having an average particle size of about 1 micron in an aqueous dispersion with a solids content of 22 weight percent. This graphite was sold by Graphite Products, Brookfield, Ohio, U.S.A., under the trademark designation "LS 2200".

EXAMPLE 5(c)

This example utilized graphite having an average particle size of 1 micron in an aqueous dispersion with a solids content of 22 weight percent. This graphite was sold by Graphite Products under the trademark designation "LS 2220".

EXAMPLES 5(d) and 5(e)

These examples utilized graphite having an average particle size of 0.25 to 3 microns in an aqueous dispersion with a solids content of 22 weight percent. This graphite was sold by Acheson Colloids Corp., Port Huron, Mich., U.S.A., under the trademark designation "Aquadag".

TABLE II

| Example No. | Pigment Conc. (wt % FEP solids) | Peel Values (g/cm) Days | | | | Bond Retention after 21 days (% of initial) |
|---|---|---|---|---|---|---|
| | | 0 | 7 | 14 | 21 | |
| 5(a) | 4.6 | 248 | 354 | 280 | 252 | 102 |
| 5(b) | 7 | 334 | 311 | 405 | 236 | 71 |
| 5(c) | 7 | 260 | 374 | 216 | 106 | 41 |
| 5(d) | 7 | 209 | 122 | 157 | 153 | 74 |
| 5(e) | 3.5 | 406 | 347 | 275 | 343 | 84 |
| Control | 0 | 568 | 181 | 204 | 157 | 28 |

EXAMPLE 6

Polyimide film of the kind and thickness as set out in Example 1 was coated on both sides by dipping it into the coating dispersion of Example 5(e), but including 1 weight percent of the silane of Example 4. The coated film was then dried and cut into strips about 0.63 centimeter wide resulting in a laminar structure having a polyimide inner layer and two outer layers of a graphite pigmented copolymer of hexafluoropropylene and tetrafluoroethylene. The outer layers were about 2.5 microns thick. The strips of laminar structure were used to spirally wrap 20 gauge copper wire (0.81 millimeters in diameter) with about a 50 percent overlap from one layer to the next. Before sealing the spiral wrapping, a second spiral wrapping of the same laminar structure of this invention was applied, wound in the opposite direction from the first wrapping. As a control, more of the same copper wire was spirally wound by strips of a coating material identical with that above-used except that the coating material for the control was unpigmented. The control was also doubly-wrapped in opposite directions.

Both wires were exposed in an oven with air at a temperature of 495° C. for 24 seconds to seal the windings and form a continuous insulating coating.

The wire coated by the laminar structure of this invention had a shiny black appearance; and, because the polyimide material has a color very like the color of copper, it was difficult to determine by simple observation whether the wire coated by the unpigmented fluoropolymer was coated at all.

Wires wrapped by the laminar structure of this invention and control wires wrapped by unpigmented material were heat aged for 26 days at 230° C. At the end of that heat aging time, tubes of the sealed wrapping material were stripped from the wires and were pulled to break in a tensile tester. Results of those tensile tests were compared with tensile test results from stripped tubes of the sealed wrapping material before any heat aging had been accomplished. The results are in Table III.

TABLE III

| Example No. | Tensile Strength (MPa) Days | | Strength Retention (%) |
|---|---|---|---|
| | 0 | 26 | |
| 6 | 193 | 200 | 103 |
| Control | 186 | 158 | 85 |

The above-described test is identified by the Underwriters Laboratories as U.L.-83 Thermal Aging of Thermoplastic Insulated Wires.

EXAMPLE 7

In this example, the strips of material from Example 6, but about 1.25 centimeters wide, were used to spirally wind a coaxial cable. The coaxial cable was of the kind used for cable television transmission and was characterized as TV drop cable. It had a core wire conductor surrounded by a polyethylene inner insulator, an aluminum metal wrapped conductor on the polyethylene, a woven metal casing on the metal wrapping, a fiber glass insulator layer surrounding the casing, and an uncoated, unpigmented, polyimide film as the outermost layer.

That coaxial cable was spirally wound by strips of the pigmented laminar structure and, as a control, by identical strips without pigment. The wound cables were then placed in a radiant heating oven to seal the winding, and the energy input of the oven was varied to determine the heat necessary to seal the wound strips. It was determined that cable wound by the laminar structure of this invention sealed at an oven setting of 4 kilowatts while cable wound by the unpigmented control material did not seal until an oven setting of 7 kilowatts was reached. While it is not believed that the presence of the pigment alters the melting point of the fluoropolymer, it is believed that the pigment causes increased absorption of heat energy into the fluorocarbon outer layers of the structure. The differences in oven settings noted above are believed to represent a 43 percent savings of energy to seal the structure of this invention compared with the energy required to seal the unpigmented control structure.

In conducting the tests of this example, it was found to be of critical importance that both of the outer layers must be pigmented. When strips of that laminar structure are spirally wound around wire or cable, opposite outer layers of the strips are in contact. Only when both of the opposite layers are pigmented is there assurance that both of the layers will fuse at the same minimum energy input.

EXAMPLE 8

In this example, the strips of material from Example 6, but about 0.87 centimeters wide, were used to spirally wind a telephone cable. The telephone cable included a three-pair, polyvinyl chloride insulated, core and was jacketed with a non-woven glass tape.

That cable was spirally wound by strips of the pigmented laminar structure and, as a control, by identical strips without pigment. Both, the cable would by pigmented material and the control-wound cable, were over-laid by a winding of strips containing the unpigmented coating.

The wound cables were placed in a radiant heating oven to seal the windings, and the energy input of the oven was varied to determine the heat necessary to seal the wound strips without fusing the polyvinyl chloride insulation. It was determined that cables wound by strips of the pigmented laminar structure of this invention were completely sealed by exposure for 2.5 seconds at heater settings providing watt densities above 36 watts per square centimeter (based on the cable surface areas). Inspection of cables from this test revealed that all cables wound by the strips of this invention and exposed for 2.5 seconds at watt densities from 36 to 42 watts per square centimeters were completely sealed and evidenced no fusing of the polyvinyl chloride insulation.

For the control cable having no pigmented winding, it was determined that the cable winding was not completely sealed until the exposure for 2.5 seconds was 88 watts per centimeter. It was further determined that such exposure caused fusion of the polyvinyl chloride insulating material. At reduced radiant heat exposure, the unpigmented strips were not sealed.

The fluorocarbon material of the coatings in this example exhibited a melting point of about 270° C. which the polyvinyl chloride of the insulation in these cables melted at substantially below that temperature.

This example demonstrates two benefits to be realized from use of the pigmented laminar structure of this invention. First, that use of the pigmented structure permits winding heat seals to be made with about one-half the heat density required when an unpigmented structure is used. Second, that use of the pigmented structure permits a wide range in operating conditions which, in use of the unpigmented structure, there is no operating condition which results in a cable having both sealed windings and unfused polyvinyl chloride insulation.

What is claimed is:

1. A laminar structure for use in wrapping around cable or wire to provide continuous, heat sealed, electrical insulation comprising an inner layer of a polyimide and two outer layers of a pigmented fluoropolymer, wherein the outer layers have a thickness from 1 to 200 microns and consist essentially of a heat sealing fluoropolymer exhibiting a melting point of not more than about 300° C. and including from 1 to 10 percent, by weight, of heat absorbing carbon pigment with substantially the same amount of pigment dispersed in each of the outer layers.

2. The laminar structure of claim 1 wherein the fluoropolymer is a copolymer of hexafluoropropylene and tetrafluoroethylene.

3. The laminar structure of claim 2 wherein there is included 0.1 to 0.3 weight percent alpha-chloromethylphenyltrialkoxy silane based on the weight of the laminar structure with the silane concentrated at each interface between the polyimide layer and the copolymer layers.

4. The laminar structure of claim 1 wherein the fluoropolymer is a copolymer having between about 5 percent and about 50 percent by weight, based on the total fluoropolymer weight, of hexafluoropropylene and between about 50 percent and about 95 percent by weight, based on the total copyolymer weight, of tetrafluoroethylene.

5. A wire or cable spirally wrapped by a strip of the laminar structure of claim 1 wherein edges of the strip of the laminar structure overlap and the strip has been heat sealed to itself at the overlapped edges.

6. A laminar structure for use in wrapping around cable or wire to provide continuous, heat sealed, electrical insulation consisting essentially of an inner layer of a polyimide, two layers of a fluoropolymer having from 1 to 10 percent, by weight, of heat absorbing carbon pigment dispersed therein and 0.1 to 0.3 weight percent alpha-chloromethylphenyltrialkoxy silane based on the weight of the laminar structure with the silane concentrated at each interface between the polyimide layer and the fluoropolymer layers.

7. The laminar structure of claim 6 wherein the fluoropolymer is a copolymer of hexafluoropropylene and tetrafluoroethylene.

* * * * *